No. 675,483. Patented June 4, 1901.
W. B. KENDRICK.
ENVELOP AND STAMP MOISTENER.
(Application filed Dec. 6, 1900.)
(No Model.)
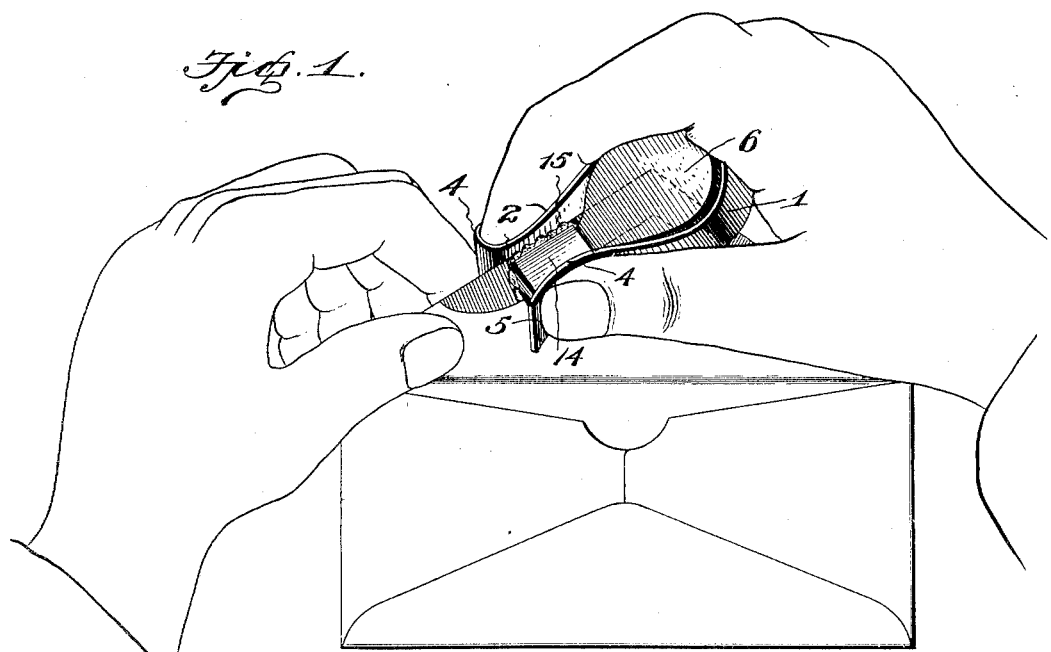
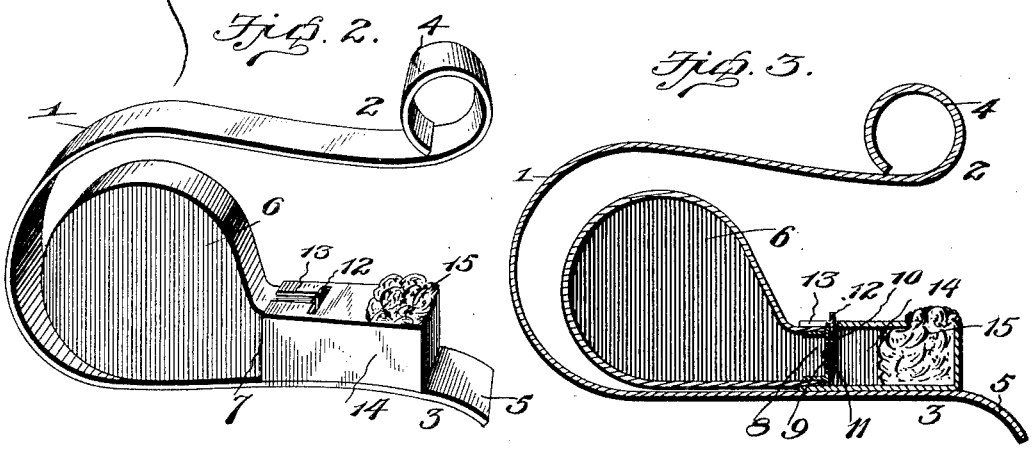
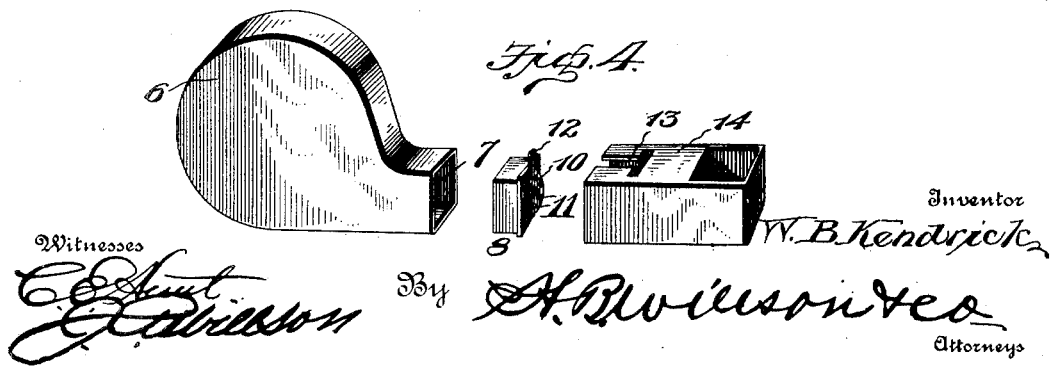
Witnesses
Inventor
W. B. Kendrick
By H. B. Willson & Co.
Attorneys

UNITED STATES PATENT OFFICE.

WALTER B. KENDRICK, OF BARRE, VERMONT.

ENVELOP AND STAMP MOISTENER.

SPECIFICATION forming part of Letters Patent No. 675,483, dated June 4, 1901.

Application filed December 6, 1900. Serial No. 38,941. (No model.)

*To all whom it may concern:*

Be it known that I, WALTER B. KENDRICK, a citizen of the United States, residing at Barre, in the county of Washington and State of Vermont, have invented certain new and useful Improvements in Envelop and Stamp Moisteners; and I do declare the following to be a full, clear, and exact description of the invention, such as will enable others skilled in the art to which it appertains to make and use the same.

This invention has relation to improvements in envelop and stamp moisteners.

The object of the invention is to provide a simple and effective device of this character which is convenient in use, cheap to manufacture, and capable also of being employed as a mucilage holder and distributer.

To this end the invention consists of certain novel features of construction, combination, and arrangement of parts, as will be hereinafter more fully described, and particularly pointed out in the appended claims.

In the accompanying drawings, Figure 1 is a perspective view illustrating the mode of use of the invention. Fig. 2 is a similar view of the device differently disposed. Fig. 3 is a vertical longitudinal section, and Fig. 4 is a perspective view showing the water-reservoir and connecting parts of the device disassociated.

Like reference-numerals designate corresponding parts throughout the several views.

The numeral 1 in the drawings represents the frame or holder of the device, which consists of a narrow strip of spring metal bent in U form to provide opposing jaws 2 and 3, one of which has a ring or loop 4 for the reception of the forefinger of the user, while the other has an outwardly-curved extremity 5 to receive the thumb of the user, as shown in Fig. 1, whereby said jaws are adapted to be moved toward and to automatically recede from each other.

Upon the inner rear portion of the jaw 2 is mounted a reservoir 6, adapted to contain either water or mucilage and formed at its forward end with a reduced rectangular nozzle or mouth 7, through which water is admitted to and discharges from said reservoir. This mouth or nozzle is adapted to be closed by a cap or cover 8, fitted by frictional contact therein and having in its outer closed end a series of perforations 9. A disk valve 10 is pivoted to the outer surface of said outer closed end of the cap and is formed with a corresponding series of perforations 11, adapted to be brought into or out of register with the perforations 9 by an oscillatory movement of the valve to let on or cut off the outflow of water. This valve has a lug or projection 12, adapted to fit within a T-shaped slot 13 in a sponge-receptacle 14, which is open at its rear end and incloses the said cap and nozzle of the water-reservoir. The said slot 13 has its cross portion extending transversely of the sponge-receptacle, so that the lug 12 may be moved therein to operate the valve. A spreader 15, consisting of sponge or some other suitable absorbent material, is fitted within the receptacle and projects to the exterior through an opening in the outer end of the inner wall thereof, so as to face the outer end of the jaw 3.

In operation the reservoir is filled with water and the parts fitted together, as shown in Figs. 2 and 3. The forefinger of one hand of the operator is then passed through the loop 4 and the thumb of the same hand brought to bear upon the outer surface of the curved extremity 5, so that the jaws 2 and 3 may be forced toward each other under the pressure of said finger and thumb. When the device is thus held, the gummed surface of the envelop or envelops to be moistened, which are held by the other hand, are inserted in between said jaws, the latter pressed together to cause the spreader to bear upon the gummed side of the envelop and the jaw 3 upon the reverse side, and the moistener then moved along said gummed side to moisten same, as clearly shown in Fig. 1. In this operation water feeds by gravity from the reservoir to the spreader and keeps the latter moist. Upon releasing the pressure upon the jaws said jaws will spring apart by their own resiliency, ready for use again.

It will be readily understood that instead of water mucilage may be contained within the reservoir and fed to the spreader in the same manner to be spread over the surface to be gummed.

The invention thus provides a device which is simple of construction, inexpensive of manufacture, convenient in use, and adapted to perform its work in an effective manner.

Having thus fully described my invention, what I claim as new, and desire to secure by Letters Patent, is—

1. A moistener of the character described having a spreader, and a spring-metal jaw movable toward and from said spreader, substantially as set forth.

2. A moistener of the character described, comprising a spring-metal holder bent in U form to present opposing jaws, and a reservoir and moistener carried by one of said jaws, substantially as set forth.

3. A moistener comprising a holder, a reservoir thereon, a cap closing the reservoir, a spreader-receptacle inclosing said cap and engaging the reservoir, and a controlling-valve on said cap, substantially as set forth.

In testimony whereof I have hereunto set my hand in presence of two subscribing witnesses.

WALTER B. KENDRICK.

Witnesses:
J. C. DYER,
E. N. PRESCOTT.